United States Patent [19]

Worthington et al.

[11] 4,374,805

[45] Feb. 22, 1983

[54] REDUCTANTS FOR REDUCING METALS IN ACID MEDIA

[75] Inventors: Ralph E. Worthington, Winter Haven, Fla.; Michael A. Smith, Valdosta, Ga.; John M. Tobias, Lakeland, Fla.

[73] Assignee: Uranium Recovery Corporation, Mulberry, Fla.

[21] Appl. No.: 147,363

[22] Filed: May 7, 1980

Related U.S. Application Data

[63] Continuation of Ser. No. 909,843, May 26, 1978, abandoned.

[51] Int. Cl.$^3$ .............................................. C01G 43/00
[52] U.S. Cl. ........................................ 423/10; 423/8; 423/20; 423/21.1; 423/53; 423/62; 423/138; 423/321 R
[58] Field of Search ................ 423/8, 10, 18, 20, 21.1, 423/53, 321 R, 62, 138

[56] References Cited

U.S. PATENT DOCUMENTS

| | | | |
|---|---|---|---|
| 2,830,872 | 4/1958 | McCullough | 423/10 |
| 2,859,092 | 11/1958 | Bailes | 423/10 |
| 2,860,031 | 11/1958 | Grinstead | 423/10 |
| 3,479,139 | 11/1969 | Koerner | 423/321 S |
| 3,711,591 | 1/1973 | Hurst et al. | 423/10 |
| 3,835,214 | 9/1974 | Hurst et al. | 423/10 |
| 3,978,196 | 8/1976 | Toshimitsu et al. | 423/321S |
| 4,087,512 | 5/1978 | Reese et al. | 423/321 R |

OTHER PUBLICATIONS

Baes, "J. Phys. Chem.", 60, 805–806, (1956).
Bailar et al, "Comprehensive Inorganic Chemistry", I, pp. 1328, 1337–1338 & 1360, Pergamon Press, (1973) Oxford.
Hawley, "The Condensed Chemical Dictionary", 8th Ed., pp. 386 & 784, Van Nostrand Reinhold Company, (1971), New York.

*Primary Examiner*—Edward A. Miller
*Attorney, Agent, or Firm*—Fleit & Jacobson

[57] ABSTRACT

Metals such as iron, uranium, vanadium, molybdenum and rare earths are reduced to lower oxidation states in various acid media using silicon metal or an iron-silicon alloy. In particular, ferric iron and hexavalent uranium in wet-process phosphoric acid are reduced to the ferrous and tetravalent states, respectively, using silicon metal or an iron-silicon alloy to provide a feed acid which is suitable for extraction with an extractant which is selective for tetravalent uranium such as a mixture of mono- and di-(alkylphenyl) esters of orthophosphoric acid.

18 Claims, No Drawings

REDUCTANTS FOR REDUCING METALS IN ACID MEDIA

This is a continuation of application Ser. No. 909,843 filed May 26, 1978, and now abandoned.

BACKGROUND OF THE INVENTION

This invention relates to the reduction of metals in various acid media and, more particularly, to the reduction of ferric iron and hexavalent uranium contained in phosphoric acid produced by the acidulation of phosphate rock.

Most of the world's production of phosphate comes from marine phosphorites, and large deposits exist in Florida and the Western United States. These deposits generally contain from 50 to 200 ppm uranium (0.005 to 0.02%, or 0.1 to 0.4 pounds per ton). Although these concentrations are only 5% to 10% as high as those of commercially mined uranium ores, the vast extent of these deposits has made them of considerable interest as a uranium source for many years. It has been reported, for example, that mineable reserves of phosphate rock in the United States alone contain about 600,000 tons, or more than 1 billion pounds, of uranium.

A large and increasing portion of commercial phosphate production is converted first to a relatively dilute phosphoric acid by the so-called "wet-process" (as distinguished from the furnace process which produces elemental phosphorus by direct reduction of the ore). The producer first manufactures sulfuric acid, then uses it to digest the rock. The chemical reaction forms phosphoric acid and calcium sulfate. The latter is filtered out, providing enormous quantities of gypsum, a waste produce, and leaving an acid stream typically containing about 30% $P_2O_5$. Most of the uranium in the original rock shows up in the 30% acid, and various extraction processes have been developed to extract it therefrom. The 30% acid is generally evaporated to about 54% "merchant acid", which is either sold or used to manufacture a variety of products, chiefly fertilizers. The higher the acid concentration, the harder it is to extract the uranium, so the 30% stage is where the uranium extraction must take place. If uranium is not extracted, it ends up as a minor impurity in the various end products.

A number of prior processes have been developed to recover the minor amounts of uranium contained in wet-process phosphoric acid. In many of these processes, any hexavalent uranium is first reduced to the tetravalent state by the addition of iron and then extracted by contacting the acid with an organic extractant, such as a mixture of mono- and di-(alkylphenyl) esters of orthophosphoric acid, which has a high extraction coefficient for uranium in the tetravalent state. As is known, the coefficient of extraction ($E_a^o$) is a measure of the extraction powder of a reagent and is defined as the ratio of the concentration of uranium in the organic phase to the concentration of uranium in the aqueous phase at equilibrium.

The reduction of hexavalent uranium in wet-process phosphoric acid to tetravalent uranium necessarily requires the reduction of some of the other metallic impurities to lower oxidation states. Iron, for example, must be at least partially reduced from the ferric state to the ferrous state because the oxidation state of the iron tends to control the oxidation state of the uranium. Therefore, to reduce the uranium it is necessary to reduce some or all of the iron in solution, and there is about 60 times as much iron as uranium. Only a small amount of the iron is typically found in the reduced (ferrous) state.

In the past, the ferric iron has been reduced such that the ferrous iron concentration is at least about 10% of the total iron content and preferably 20% or above in an attempt to achieve a good extraction coefficient ($E_a^o$). We have found that, even when all the uranium is in the tetravalent state, the presence of iron in the ferric state is detrimental to the extraction coefficient of a mixture of mono- and di-(alkylphenyl) esters of orthophosphoric acid. This detrimental effect has been found even when a phenol modifier such as nonylphenol or octylphenol is present which eliminates the precipitation of ferric salt of the mixed ester as disclosed in commonly assigned, copending application Ser. No. 772,818, filed Feb. 28, 1977, for "PROCESS FOR EXTRACTING URANIUM FROM WET-PROCESS PHOSPHORIC ACID" by William M. Leaders et al.

The use of iron metal to reduce the ferric iron in the acid to low levels, for example concentrations less than 1.5 g/l, is normally uneconomical since at these low levels of ferric iron concentration the efficiency of the reaction $2Fe^{+3} + Fe^o \rightarrow 3Fe^{+2}$ is low, and much of the iron is consumed in producing hydrogen gas in accordance with the reaction $Fe^o + 2H^+ \rightarrow Fe^{+2} + H_2 \uparrow$. Moreover, the additional iron which is necessarily dissolved in the acid makes the acid more difficult to process by the acid producer into "merchant grade" acid. Other metals, such as zinc, copper, and tin, although effective, must also be excluded as potential reductants on the basis of their cost.

There is also a need in the art for an effective reductant for other metals contained in wet-process phosphoric acid and other acid media. These metals include vanadium, molybdenum and rare earths and the acid media include sulfuric and hydrochloric acid as well as phosphoric acid.

Accordingly, it is an object of the present invention to provide an improved process for reducing metals in acid media.

A further object of the present invention is to provide an improved process for reducing ferric iron and hexavalent uranium in wet-process phosphoric acid.

A still further object of the present invention is to provide an improved process for reducing ferric iron and hexavalent uranium in wet-process phosphoric acid to provide a feed acid which is suitable for extraction with an extractant which is selective for tetravalent uranium.

Still a further object of the present invention is to provide a process for reducing ferric iron and hexavalent uranium in wet-process phosphoric acid to provide a feed acid which is suitable for extraction with mono- and di(alkylphenyl) esters of orthophosphoric acid.

Yet a further object of the present invention is to provide a process for reducing ferric iron and hexavalent uranium in wet-process phosphoric acid which provides a feed acid which can be more efficiently extracted.

A still further object of the present invention is to provide a process for reducing metals in acid media which is economical and minimizes the consumption of costly reagents.

SUMMARY OF THE INVENTION

These and other objects are accomplished according to the present invention by reducing metals such as iron, uranium, vanadium, molybdenum and rare earths to lower oxidation states in acid media such as wet-process phosphoric acid, sulfuric acid and hydrochloric acid using silicon metal or an iron-silicon alloy. More particularly, these and other objects are accomplished according to the present invention by reducing the ferric iron and hexavalent uranium in wet-process phosphoric acid with silicon metal or an iron-silicon alloy to provide a feed acid which is suitable for extraction with an extractant which is selective for tetravalent uranium such as a mixture of mono- and di-(alkylphenyl) esters of orthophosphoric acid.

We have found that powdered elemental silicon metal and iron-silicon alloy are preferred to the corresponding bulk or massive metal and alloy because of the increased reactivity which is obtained. We have also found that the efficiency of reduction of the iron-silicon alloy is extremely high, several times higher on a mole per mole basis, than elemental iron when used to reduce wet-process phosphoric acid to obtain extremely low ferric iron concentrations. This high reduction efficiency results in low usage rates and consequently lower iron addition to the wet-process phosphoric acid.

Of the materials tested, powdered iron-silicon alloy is the most rapidly reacting, especially at temperatures in excess of 70° C., and complete reduction of ferric iron to ferrous iron, for example, can be attained in less than 10 minutes with vigorous agitation using rates of addition of only 1 gram iron-silicon alloy for every 2.1 to 4 grams of ferric iron to be reduced, all the iron-silicon alloy being consumed in this time. At lower temperatures, the reaction rate is much slower. For example, at 60° C., 30 minutes is needed to achieve the same result. More rapid reduction can still be attained at this temperature, however, by utilizing a large excess of the powdered iron-silicon alloy. The reduction, which is dependent upon the surface area of iron-silicon alloy available for reaction, can be completed in 10 minutes using a large excess of iron-silicon alloy over that required for complete reduction. Quantities 20 to 200 times stoichiometric have been used successfully. As soon as reduction is complete, the excess, unreacted iron-silicon alloy should be removed from the acid by, for example, settling or centrifugal separation (e.g., hydroclones).

The unreacted iron-silicon alloy can be recycled to reduce further acid along with an equivalent stoichiometric addition of fresh alloy to recreate the same excess as in the original reaction. Unless the excess is removed in some way at the completion of reduction, the alloy continues to dissolve in the acid liberating hydrogen and increasing the iron content of the acid to no useful purpose.

DESCRIPTION OF THE PREFERRED EMBODIMENTS

In accordance with the present invention, metals such as iron, uranium, vanadium, molybdenum and rare earths are reduced to lower oxidation states in acid media. While the following description will primarily refer to the reduction of iron and uranium in wet-process phosphoric acid, it should be understood that the above metals can be reduced in various acid media including sulfuric acid and hydrochloric acid.

Wet-process phosphoric acid which is obtained by the acidulation of uncalcined phosphate rock with sulphuric acid and which typically contains about 25 to 35% $P_2O_5$ is treated with silicon metal or an iron-silicon alloy so that any of the uranium in the phosphoric acid that may be in the hexavalent state in reduced to the tetravalent state and ferric iron in the phosphoric acid is reduced to the ferrous state. Since the oxidation state of the iron tends to control the oxidation state of the uranium, substantially all of the uranium will be in the reduced tetravalent state even at relatively high ferric iron concentrations. However, to avoid ferric iron interference with extraction, the ferric iron should be reduced such that the ferric iron concentration is at least below 10 grams/liter, preferably below 5 grams/liter and most preferably below 1 gram/liter.

The term "silicon" or "silicon metal" as used herein is intended to refer to elemental silicon. The term "iron-silicon alloy" as used herein is intended to refer to an alloy of iron and silicon such as used to add silicon to steel. Depending upon the silicon content, iron-silicon alloys are commonly referred to in the art as ferrosilicon alloys or silvery pigiron. The iron-silicon alloy can have a silicon content from about 5 to 100% by weight, preferably 5 to 80% by weight, and most preferably 5 to 20% by weight.

The silicon metal and iron-silicon alloy reductants are preferably employed in powdered form because of the increased reactivity which is obtained compared to the corresponding bulk or massive metal and alloy. The term "powdered" as used herein is intended to refer to a particle size below 1/16 inch. The preferred particle size is below 150 microns wherein, most preferably, 50% of the particles are below 44 microns.

The reduction is preferably performed in an agitated vessel. The agitation provides good contact between the reductant and the acid and keeps the reductant suspended. The reduction can also be carried out using a fixed bed of the reductant and passing the acid to be reduced through the bed, particularly when the acid does not contain suspended solids.

The quantity of reductant contacted with the acid can vary from stoichiometric to a large excess (e.g., 20 to 200 times stoichiometric) depending on the temperature, reaction time desired, completeness of the reduction desired, reaction rate of the reductant, etc. If an excess of the iron-silicon alloy reductant is employed, the excess, unreacted reductant should be removed from the acid as soon as the desired degree of reduction is complete. The excess, unreacted iron-silicon alloy can be removed from the reduced acid by, for example, settling or centrifugal separation (e.g., hydroclones). Unless the excess, unreacted iron-silicon alloy is removed at the completion of the reduction, the alloy will continue to dissolve in the acid liberating hydrogen and increased the iron content of the acid without providing any further reduction. This increase in the iron content of the acid should be avoid since it is economically undesirable and since, in the case of wet-process phosphoric acid for example, the additional iron makes the acid difficult to process by the acid producer into "merchant acid".

The reductants can be employed at a temperature of 50° to 80° C. which is the temperature normally encountered with freshly produced wet-process phosphoric acid. As a result, it is not necessary to either cool or heat the acid to reduce the ferric iron when wet-process acid is reduced. This results in less hold-up time and storage facilities. It should be understood, however, that the reduction can be conducted at somewhat higher or lower temperatures than those normally encountered with freshly produced wet-process phosphoric acid although the reactive time involved will change.

The reaction rate is dependent upon the temperature. With respect to the iron-silicon alloys, the reaction proceeds rapidly at temperatures in excess of 70° C., and complete reduction of ferric iron to ferrous iron, for example, can be attained in less than 10 minutes with vigorous agitation. At lower temperatures, the reaction rate is much slower. For example, at 60° C., 30 minutes is needed to achieve the same result. The reaction rate can be increased at the lower temperatures by utilizing a large excess of the iron-silicon alloy. It is presently preferred, however, to use a stoichiometric amount of iron-silicon alloy and to provide a longer reaction time, typically an hour. The silicon metal reacts more slowly than the iron-silicon alloy and further time is required for complete reduction.

The silicon metal and iron-silicon alloy reduction is catalyzed by fluoride ion ($F^-$). The presence of fluoride ion has been found necessary to obtain practical reaction rates using both silicon metal and iron-silicon alloy. However, the quantity of fluoride ion necessary to catalyze the reduction using iron-silicon alloy is less than that required to catalyze the reduction using silicon metal. Wet-process phosphoric acid normally contains relatively large quantities of fluoride ion, typically up to 30 grams/liter or possibly higher. This is particularly true of the wet-process phosphoric acid produced from phosphate ore mined in Florida. Satisfactory reaction rates can be attained using the iron-silicon alloy reductant without adding any additional fluoride ion to normal wet-process phosphoric acid. In the case of the silicon metal reductance, however, it is normally necessary to add from 20 to 30 grams/liter of fluoride ion added as hydrogen fluoride or the like.

When reducing metals containing no substantial fluoride ion, it is necessary to add fluoride ion to the acid to catalyze the reduction. In general, the acid should contain at least 1 gram/liter, preferably 1 to 50 grams/liter and most preferably 5 to 50 grams/liter of fluoride ion. It should be understood, however, that somewhat lower fluoride ion addition will produce satisfactory reaction rates when an iron-silicon alloy is employed. It should also be understood that the addition of fluoride ion to wet-process phosphoric acid may be required even when using an iron-silicon alloy when the wet-process phosphoric acid does not contain an appreciable fluoride ion content such as the acid produced from phosphate mined in Morocco.

In the case of wet-process phosphoric acid, the acid is preferably treated prior to reduction to remove the solid organic materials such as humic acids contained in the acid. The solid organic materials can be removed as described in commonly assigned, U.S. Pat. No. 4,087,512 in which the acid is contacted with a liquid hydrocarbon such as kerosene so that the solid organic materials are suspended in an emulsion within the hydrocarbon phase. Any other prior art technique for removing the solid organic materials can also be employed to provide a clean acid feed to be reduced by the silicon metal or iron-silicon alloy.

The uranium in the reduced wet-process phosphoric acid, in the tetravalent state, is extracted with an extractant which is selective for tetravalent uranium, preferably a mixture of mono- and di-(alkylphenyl) esters of orthophosphoric acid. The preferred mixed esters are prepared from commercially available octylphenol. The preferred mixture of esters is approximately an equimolar mixture of the mono- and di-esters. The ester mixture is employed in an inert nonpolar diluent. Suitable inert nonpolar diluents include, for example, aliphatic hydrocarbons, petroleum fractions low in aromatics, and chlorinated hydrocarbons. The preferred diluents are refined high-boiling, high-flash point petroleum fractions containing between 10 and 50% by volume naphthenes with the balance being principally aliphatic. The extractant solution should contain from about 10 to 40% by volume, and preferably about 15 to 25% by volume, of the ester mixture. In general, the volume ratio of the wet-process acid to the extractant solution should be 3 to 10:1.

In carrying out this extraction step, the extractant and the reduced wet-process phosphoric acid are intimately mixed together and then the phases are allowed to separate. This intimate intermixing can be accomplished either in a batch operation or in a continuous manner concurrently or countercurrently with countercurrent flow preferred. Apparatus for accomplishing intermixing and separation of two substantially immiscible phases are well known in the art and any conventional apparatus can be used for this purpose. It is preferred to operate the extraction in the aqueous continuous mode using a countercurrent uranium extraction unit.

Preferably, the wet-process phosphoric acid should be maintained at a temperature of about 50° to 80° C. during this extraction step. By maintaining by wet-process phosphoric acid at this temperature, impurities such as calcium sulphate are kept in solution which leads to less scale formation in the system which results in less down time for cleanout being required. After the uranium is extracted, the wet-process phosphoric acid is returned to the phosphoric acid production plant to be evaporated to 54% merchant acid.

After extraction, the uranium in the mixed ester extractant is stripped of its uranium content. This can be accomplished by oxidizing the uranium in the organic extractant to the hexavalent state and then stripping the uranium from the organic extractant with concentrated phosphoric or hydrochloric acid as shown in U.S. Pat. No. 2,859,092 to Bailes et al. The uranium can also be stripped from the organic extractant by means of oxidative stripping such as disclosed in U.S. Pat. No. 3,835,214 to Hurst et al. The extractant withdrawn from the stripping apparatus, now substantially free of its uranium content, is recycled and contact with more wet-process phosphoric acid. The uranium in the stripping solution is then recovered by conventional technique such as shown in the Bailes et al and Hurst et al patents.

To facilitate understanding the advantages and operation of the present invention, the following examples are provided to specifically illustrate the use of the reductants of the present invention in reducing ferric iron in wet-process phosphoric acid. It will be understood that the reduction of the ferric iron in the examples is accompanied by a reduction of the uranium in the acid to the tetravalent state.

EXAMPLE 1

Fresh 30% $P_2O_5$ phosphoric acid produced by the wet-process at 71° C. containing 9.3 grams/liter of total iron of which 9.0 grams/liter was present in the ferric ($Fe^{+3}$) state and about 20 grams/liter fluoride ion was continuously fed to a reactor of 120 liters active capacity at a rate of 4 liters/minute. The reactor was vigorously agitated and powdered iron-silicon alloy (approximately 15%, Si, 85% Fe by weight) having a particle size below 150 microns and having 50% of the particles below 44 microns was fed at a rate of 12 grams/minute (3 grams/liter based on the acid feed) to the reactor. Acid was continuously overflowed from the reactor to an unagitated vessel of 10 liters capacity, which acted as a settler for any unreacted iron-silicon alloy. The acid overflowing from this vessel was found to contain 11.8 grams/liter of total iron of which only 0.3 grams/liter was in the $Fe^{+3}$ form. After four hours of operation, the settler was emptied and found to contain 442 grams of unreacted iron-silicon alloy giving a satisfactory mass balance.

EXAMPLE 2

Wet-process phosphoric acid at 60° C. containing 30% $P_2O_5$, 10.1 grams/liter of total iron (9.7 grams/liter $Fe^{+3}$) and about 20 grams/liter fluoride ion was fed at 4 liters/minute to the 120 liter reactor described in Example 1. Six (6) kilograms of powdered iron-silicon alloy as described in Example 1 was added to the reactor initially and then addition was continued at a rate of 200 grams/minute (50 grams/liter based on the acid feed). Acid leaving the settler still contained a considerable amount of iron-silicon alloy which was generating hydrogen. This was removed by centrifugation and the acid found to contain 14.6 grams/liter total iron with 0.26 grams/liter in the $Fe^{+3}$ state.

EXAMPLE 3

One liter of wet-process phosphoric acid at 60° C. containing 30% $P_2O_5$ and about 20 grams/liter fluoride ion was agitated with 100 grams of powdered silicon metal having a particle size below 150 microns. Thirty (30) grams/liter of fluoride ion was added to the acid as hydrogen fluoride at the start of the reaction. Samples were removed at intervals and analyzed for iron content. The original acid contained 9.1 grams/liter total iron, of which 8.1 grams/liter was in the $Fe^{+3}$ state. Results at various intervals were as follows:

| Time (mins) | Total Fe Concentration (g/l) | $Fe^{+3}$ Concentration (g/l) |
|---|---|---|
| 15 | 9.1 | 2.4 |
| 30 | 9.1 | .7 |
| 45 | 9.1 | .2 |
| 60 | 9.1 | .0 |

As will be readily understood by those of ordinary skill in the art, modifications may be made in the process described above without departing from the spirit and scope of the invention. Moreover, it should be understood that the process can be used to reduce ferric iron to the ferrous state in wet-process phosphoric acid in which the uranium values are already in the tetravalent state by virtue of iron or other reduction. In addition, it should be understood that any extractant which is selective for tetravalent uranium can be employed to extract the uranium from the wet-process phosphoric acid. Thus, pyrophosphoric acids prepared by the reaction of $P_2O_5$ and long-chain alcohols and other extractants known in the art can be employed in addition to the mixed esters discussed above. Accordingly, it should be understood that the invention is not to be limited to the exact details disclosed above, but is to be defined in accordance with the appended claims.

We claim:

1. A process for reducing iron from the ferric to the ferrous state in wet-process phosphoric acid comprising contacting wet-process phosphoric acid containing ferric iron with a reductant selected from the group consisting of silicon metal and iron-silicon alloy containing about 5 to 80% silicon by weight to reduce at least a portion of said ferric iron in said wet-process phosphoric acid to the ferrous state.

2. The process of claim 1 wherein the temperature of said wet-process phosphoric acid is above 60° C. and a stoichiometric amount of iron-silicon alloy is employed.

3. The process of claim 1 wherein the temperature of said wet-process phosphoric acid is below 60° C. and 10 to 200 times the stoichiometric amount of iron-silicon alloy is employed.

4. The process of claim 3 wherein excess iron-silicon alloy is removed from the reduced wet-process phosphoric acid.

5. The process of claim 4 wherein said excess iron-silicon alloy after removal from said reduced wet-process phosphoric acid is recycled to reduce further fresh acid.

6. The process of claim 1 wherein said reductant is powdered.

7. The process of claim 1 wherein the temperature of said wet-process phosphoric acid is about 50° to 80° C.

8. A process for reducing iron from the ferric to the ferrous state in wet-process phosphoric acid comprising agitating wet-process phosphoric acid containing about 25 to 35% $P_2O_5$ and ferric iron with a powdered reductant selected from the group consisting of silicon metal and iron-silicon alloy containing about 5 to 20% silicon by weight at a temperature of about 50° C. to 80° C. until at least a portion of said ferric iron is reduced to the ferrous state in said wet-process phosphoric acid and then removing any excess, unreacted reductant from said wet-process phosphoric acid.

9. A process for the recovery of uranium from wet-process phosphoric acid derived from the sulfuric acid acidulation of uncalcined phosphate rock comprising contacting wet-process phosphoric acid containing ferric iron and uranium values with a reductant selected from the group consisting of silicon metal and iron-silicon alloy containing about 5 to 80% silicon by weight to reduce ferric iron to ferrous iron and any hexavalent uranium to tetravalent uranium and contacting the reduced wet-process phosphoric acid with an organic extractant selective for uranium in the tetravalent state.

10. The process of claim 9 wherein said organic extractant is an about 10 to 40% by volume solution of a mixture of mono- and di-(alkylphenyl) esters of orthophosphoric acid in an inert diluent.

11. The process of claim 10 wherein said organic extractant is a mixture of mono- and di-(octylphenyl) esters or orthophosphoric acid.

12. A process for reducing a metal to a lower oxidation state in an acid comprising contacting an acid selected from the group consisting of phosphoric acid, sulfuric acid and hydrochloric acid containing the metal selected from the group consisting of iron, uranium, vanadium, molybdenum and a rare earth with a reductant selected from the group consisting of silicon metal and iron-silicon all containing about 5 to 80% silicon by weight in the presence of fluoride ion to reduce at least a portion of said metal in said acid to a lower oxidation state.

13. The process of claim 12 wherein the fluoride ion is present in an amount of about 1 to 50 grams/liter.

14. The process of claim 12 wherein the fluoride ion is present in an amount of about 5 to 50 grams/liter.

15. The process of claim 12 wherein the acid is selected from the group consisting of sulfuric acid and hydrochloric acid.

16. The process of claim 12 wherein the reduction is carried out at a temperature of 50° to 80° C.

17. The process of claim 12 wherein the fluoride ion is added to the acid as hydrogen fluoride.

18. A process for reducing a metal to a lower oxidation state in an acid comprising agitating an acid selected from the group consisting of phosphoric acid, sulfuric acid and hydrochloric acid containing a metal selected from the group consisting of iron, uranium, vanadium, molybdenum and a rare earth with a powdered reductant selected from the group consisting of silicon metal and iron-silicon alloy containing about 5 to 20% silicon by weight in the presence of fluoride ion in an amount of at least 1 gram/liter at a temperature of about 50° C. to 80° C. until at least a portion of said metal is reduced to a lower oxidation state in said acid and then removing any excess, unreacted reductant from said acid.

* * * * *